(12) United States Patent
Roach

(10) Patent No.: US 6,475,412 B1
(45) Date of Patent: Nov. 5, 2002

(54) PROCESS FOR MAKING POLYURETHANEUREA POWDER

(75) Inventor: David Herbert Roach, Wilmington, DE (US)

(73) Assignee: E. I. du Pont de Nmeours and Company, Wilmington, DE (US)

(*) Notice: Subject to any disclaimer, the term of this patent is extended or adjusted under 35 U.S.C. 154(b) by 215 days.

(21) Appl. No.: 09/668,130

(22) Filed: Sep. 22, 2000

(51) Int. Cl.7 .............................. B32B 5/16; B02C 4/44
(52) U.S. Cl. ...................... 264/37.1; 264/141; 428/402
(58) Field of Search ................ 264/37.1, 141; 428/402

(56) References Cited

U.S. PATENT DOCUMENTS

| | | | |
|---|---|---|---|
| 3,970,601 A | * 7/1976 | Weber et al. | ............... 427/195 |
| 4,070,346 A | 1/1978 | Schnoring et al. | |
| 5,250,245 A | * 10/1993 | Collins et al. | ............... 264/103 |
| 5,395,055 A | 3/1995 | Shutov et al. | |
| 5,669,599 A | 9/1997 | Wagner et al. | ................. 241/23 |
| 5,879,596 A | * 3/1999 | Roach | ......................... 264/28 |
| 5,973,013 A | 10/1999 | Igwe | |
| 6,214,145 B1 | * 4/2001 | Umezawa et al. | ........... 156/167 |

FOREIGN PATENT DOCUMENTS

| | | | |
|---|---|---|---|
| DE | 4224164 | 3/1992 | ............ C08L/75/00 |
| DE | 4309139 | 3/1993 | ............ C08L/75/00 |
| DE | 4309228 | 3/1993 | ............ C08L/75/00 |

OTHER PUBLICATIONS

M. Xanthos, *Reactive Extrusion Principles and Practice*, Oxford University Press 1992, p. 222–225.

* cited by examiner

Primary Examiner—Hoa T. Le

(57) ABSTRACT

Polyurethaneurea powders, prepared from spandex under specific process conditions, are provided.

8 Claims, No Drawings

US 6,475,412 B1

PROCESS FOR MAKING POLYURETHANEUREA POWDER

BACKGROUND OF THE INVENTION

1. Field of the Invention

This invention relates to a process of making powders from polyurethaneurea-based spandex and, more specifically, to a process of extruding spandex under specific conditions to produce a powder.

2. Description of Background Art

Recycling and re-using polymeric materials have become important industrial considerations. Such recycled polymers, including polyurethanes and polyurethaneureas, can be used as modifiers for molding resins, hot-melt adhesives, cosmetics, and the like.

Several methods have been used to recycle crosslinked polyurethanes. German Patent 4,309,139 discloses shredding crosslinked polyurethane foams in two steps to form a powder. German Patent 4,309,228 discloses cutting up crosslinked polyurethane foam, pressing the cut foam into 3-mm diameter strands by use of a flat-matrix press, and granulating the strands. German Patent 4,224,164 discloses production and processing of granulated crosslinked polyurethane plastics in an extruder. U.S. Pat. No. 5,669,559 discloses processing precomminuted cross-linked polyurethanes with a roll mill to form powders.

None of the foregoing references, however, discloses the recycling of soft, tacky polyurethaneureas based substantially completely on linear, difunctional ingredients. Their recycling has heretofore been carried out by cryogenic grinding.

It has now been found that a finely divided polyurethaneurea can be prepared by an unexpectedly simple, one-step process from spandex.

BRIEF SUMMARY OF THE INVENTION

The process of the present invention for making a polyurethaneurea powder comprises the steps of:

feeding a polyurethaneurea-based spandex to an extruder having at least one heating zone at a rate less than the maximum feed rate of the extruder; and extruding the spandex so that it is subjected to an average temperature range and a total residence time range such that the polyurethaneurea is not degraded and the powder is formed.

DETAILED DESCRIPTION OF THE INVENTION

As used herein, "spandex" has its customary meaning, that is, a manufactured fiber in which the fiber-forming substance is a long chain synthetic elastomer comprised of at least 85% by weight of a segmented polyurethane. Due to the extreme difficulty of spinning crosslinked polymers into fiber, the elastomer from which the spandex is prepared is in turn made from bifunctional ingredients such as polymeric glycols, diisocyanates, and one or more difunctional isocyanate-reactive chain extenders.

Polymeric glycols used in making spandex include polyethers such as poly(tetramethyleneether) glycol and poly (tetramethylene-co-3-methyltetra-methyleneether) glycol, polyesters (such as poly(ethylene-co-tetramethylene terephthalate) glycol and poly(2,2-dimethylpropylene dodecanoate) glycol, and polycarbonates such as poly (pentane-1,5-carbonate) glycol and poly(hexane-1,6-carbonate) glycol.

The most commonly used diisocyanate is 1,1'-methylenebis(4-isocyanatobenzene). Useful chain extenders include diols, diamines, and alkanolamines. When diols are used, polyurethanes are formed; when diamines or alkanolamines are used, polyurethaneureas are formed. Unless they are chemically crosslinked, polyurethanes are generally thermoplastic. Even in the absence of chemical crosslinks, polyurethaneureas are generally not thermoplastic in the sense that they cannot be repeatedly melted without considerable degradation. Very small amounts of trifunctional ingredients can sometimes be added during the preparation of the elastomer, for example diethylenetriamine at the parts-per-million level, but this is insufficient to cause significant crosslinking, and the elastomer remains substantially linear. The process of the present invention uses spandex which is based on polyurethaneureas.

It has now been found that a "fluffy", somewhat fibrous powder can be readily prepared in a single step by passing polyurethaneurea-based spandex through an extruder. The polyurethaneurea powder can be finely or relatively coarsely divided depending on the extruder conditions used and can be formed without use of any special die at the outlet of the extruder and without the need for pre- or post-processing. The present process is considerably easier and more economical to carry out than the traditional cryogenic grinding method.

In order to obtain the polyurethaneurea powder without degradation, the temperature experienced by the spandex must be maintained as low as is consistent with forming the desired powder. The range of average temperatures to which the spandex can be subjected during processing is about 170°–220° C., preferably about 180°–200° C., while the total residence time of the spandex in the extruder is about 3.5–22 seconds, preferably about 10–20 seconds. Use of slower extruder speed (rpm) and therefore longer total residence times, about 10–20 seconds, requires lower temperatures within the above ranges in order to form the polyurethaneurea powder without degradation. Even at short total residence times, about 3.5–5 seconds, the average temperature must not exceed about 220° C. in order to avoid the formation of discolored clumps. At such total residence times, however, the spandex must be subjected in at least one heating zone of the extruder to a temperature higher than about 210° C. in order to modify the morphology of the spandex to form the powder.

Optionally, the first heating zone of the extruder can be used as a pre-heating zone (for example at a machine setting of about 150° C.), and the average temperature to which the spandex is subjected can then be measured in subsequent heating zones.

In the process of the present invention, spandex is fed to the extruder at less than the maximum feed rate the extruder is capable of processing, so that the extruder is slightly "starved". If too much material is fed to the extruder, the resulting extrudate is not a powder but rather clumps, and excessive rise in extruder torque is created. The process is not particularly sensitive to such things as a finish on the spandex (for example silicone oil).

The spandex used in the present process can have a decitex of about 11–2500, preferably about 11–155. The size distribution in the finely divided powder is such that at least about 30 wt % has an average length of about 0.1 cm.

The finely divided polyurethaneurea made by the process of the invention can be blended into other polymers. For example, when thermoplastic polymers such as Hytrel® 5556 polyetherester elastomer (DuPont) or Ultramid® B-3 polycaprolactam (BASF), both in pelletized form, were blended and extruded with the polyurethaneurea powder of this invention (10–20 weight percent), exhibited increased yield stress, while 10 wt % powder of this invention blended and extruded with Dacron® 3934 poly(ethylene terephthalate) fiber-grade resin (DuPont) or Elvax® 40W poly(ethylene-co-vinyl acetate) (DuPont) increased their tensile strengths. Comparable loadings of the powders of this invention increased both the yield stress and the tensile strength of Pellethane® 90AEF polyurethane molding resin (Ashland Chemical).

In the Examples, unless otherwise noted, a 16-mm Prism extruder (Prism, Staffordshire, UK) having five heatable zones was used. Unless otherwise noted, the machine setting on the first (pre-heating) zone was 180° C. The fifth (downstream) zone, usually present as a heated die, was removed and replaced with an unheated 1.5-inch (3.8 cm) tip to protect the operator from sharp edges and moving parts.

The remaining three zones were set so that the spandex was subjected to the measured temperatures indicated in the Examples. The throat of the extruder was cooled with room temperature (about 20° C.) water, but air was not excluded from the throat. Unless otherwise noted, the "Vacuum Extraction" screw series was used. The screw had the following sections:

3 deep feed sections
8 regular conveying sections
7 paddles @ 30° kneading sections
5 paddles @ 60° kneading sections
1 regular conveying section
1 reverse (left hand) section
2 regular conveying sections
10 paddles @ 60° kneading sections
3 regular conveying sections and
1 1.5-inch (3.8 cm) diameter tip.

The ratio of the length to the inner diameter of this extruder was 25. The extrudate was caught in pans, and room temperature (approximately 20° C.) air was blown over it to cool it. When nitrogen was used to cool the extrudate, the powder became discolored, indicating degradation.

The temperature to which the spandex was subjected was measured (as distinct from the machine setting) at the three middle zones (zones 2, 3, and 4) of the extruder. In the Tables, "RPM" refers to the speed at which the extruder was operated, and residence times were calculated from M. Xanthos, "Reactive Extrusion Principles and Practice", pp. 222–225, Oxford University Press, 1992. All spandex types used in the Examples were based on polyetherurethaneureas except for Sample 13, which was based on polyester-urethaneurea. "Comp." indicates that a sample was a comparison sample and outside the scope of this invention.

EXAMPLE 1

Two-inch length continuous filament Lycra® spandex Type 162C (11 decitex, a registered trademark of E. I. du Pont de Nemours and Company) was hand-fed into the Prism extruder at a rate that "starved" the extruder, using a nylon rod when necessary to push the spandex into the throat of the extruder. The first (pre-heating) extruder zone temperature was set at 180° C. for Comp. 1 and Samples 4, 5 and 6; at 190° C. for Comp. Samples 2, 3, 4 and 5; and at 195° C. for Samples 1, 2, and 3. The extruder rpm, calculated residence times, measured temperatures experienced by the spandex, average measured temperature in the three zones, and appearance of the resulting extrudate are reported in Table 1.

TABLE I

| SAMPLE | RPM | RESIDENCE TIME (sec) | TEMPERATURE (° C.) | | | AVG. TEMP (° C.) | PRODUCT APPEARANCE |
| --- | --- | --- | --- | --- | --- | --- | --- |
| | | | ZONE 2 | ZONE 3 | ZONE 4 | | |
| Comp. 1 | 300 | 3 | 180 | 180 | 180 | 180 | Fiber unaffected |
| Comp. 2 | 300 | 3 | 210 | 199 | 198 | 202 | Fiber unaffected |
| Comp. 3 | 200 | 5 | 209 | 199 | 198 | 202 | Broken Up |
| 1 | 125 | 9 | 216 | 205 | 203 | 208 | Coarse powder |
| 2 | 200 | 5 | 218 | 205 | 203 | 209 | Coarse powder |
| 3 | 200 | 5 | 214 | 205 | 203 | 207 | Coarse powder |
| 4 | 250 | 3.5 | 209 | 214 | 186 | 203 | Fine powder |
| 5 | 200 | 5 | 210 | 214 | 192 | 205 | Fine powder |
| 6 | 250 | 3.5 | 215 | 214 | 217 | 215 | Fine powder |
| Comp. 4 | 250 | 3.5 | 220 | 223 | 226 | 223 | Large yellow clumps |
| Comp. 5 | 200 | 5 | 220 | 223 | 226 | 223 | Large yellow clumps |

As can be seen from the data in Table I, temperatures and residence times that were too low (Comp. Samples 1, 2, 3), had relatively little effect on the spandex, and temperatures that were too high (Comp. Samples 4 and 5), degraded the spandex even when the residence times were kept short. However, coarse or fine powders can be prepared even at times no longer than 5 seconds if the spandex experiences a temperature higher than 210° C. in at least one zone and the average temperature does not exceed 220° C.

EXAMPLE 2

Lycra® spandex Types 902C (Samples 7, 8, and 9), 162C (Sample 10), and 146 (Sample 11) were processed according to the invention and substantially as in Example 1 but at the residence times and temperatures indicated in Table II.

TABLE II

| SAMPLE | RPM | RESIDENCE TIME (sec) | TEMPERATURE (° C.) ZONE 2 | ZONE 3 | ZONE 4 | AVG. TEMP (° C.) | PRODUCT APPEARANCE |
|---|---|---|---|---|---|---|---|
| 7 | 100 | 10 | 194 | 198 | 178 | 190 | Fine powder |
| 8 | 50 | 20 | 193 | 186 | 177 | 185 | Fine powder |
| 9 | 50 | 20 | 215 | 201 | 178 | 198 | Fine powder |
| 10 | 50 | 20 | 195 | 197 | 178 | 190 | Fine powder |
| 11 | 50 | 20 | 200 | 197 | 178 | 192 | Fine powder |

As can be seen from the data in Table II, spandex can be successfully converted to powder by the process of the invention at average temperatures of 180–200° C. and 10–20 second residence times.

EXAMPLE 3

Lycra® Types 128C (Sample 12), 127 (Sample 13), and 162C (Sample 14) were processed according to the invention using the 16-mm Prism extruder, but with a different screw configuration having the following sections:

3 deep feed sections 8 regular conveying sections 7 paddles @ 30° kneading sections 3 paddles @ 60° kneading sections 4 paddles @ 90° kneading sections 3 regular conveying sections 3 paddles @ 30° kneading sections 3 paddles @ 60° kneading sections 6 paddles @ 90° kneading sections 3 regular conveying sections and 1 1.5-inch (3.8 cm) diameter tip.

TABLE III

| SAMPLE | RPM | RESIDENCE TIME (sec) | TEMPERATURE (° C.) ZONE 2 | ZONE 3 | ZONE 4 | AVG. TEMP (° C.) | PRODUCT APPEARANCE |
|---|---|---|---|---|---|---|---|
| 12 | 50 | 20 | 200 | 203 | 178 | 194 | Fine powder |
| 13 | 50 | 20 | 200 | 202 | 178 | 193 | Fine powder |
| 14 | 50 | 20 | 200 | 203 | 178 | 194 | Fine powder |

As can be seen from the data in Table III, spandex, including those based on polyesterurethaneureas (Sample 13), can be successfully transformed into powders similar to those prepared in Example 2 with a different series of extruder screw flights.

EXAMPLE 4

Lycra® spandex Type 162C was washed with acetone to remove finish and dried. Unwashed Lycra® Type 162C (Sample 16) and the washed and dried Type 162C (Sample 15) were extruded according to the invention and substantially as in Example 2 but at the times and temperatures indicated in Table IV.

TABLE IV

| SAMPLE | RPM | RESIDENCE TIME (sec) | TEMPERATURE (° C.) ZONE 2 | ZONE 3 | ZONE 4 | AVG. TEMP (° C.) | PRODUCT APPEARANCE |
|---|---|---|---|---|---|---|---|
| 15 | 50 | 20 | 194 | 197 | 178 | 190 | Fine powder |
| 16 | 50 | 20 | 196 | 197 | 177 | 190 | Fine powder |

As can be seen from Table IV, the process of this invention was not affected by the presence of finish oils on the fibers.

EXAMPLE 5

Comparison

Preparation of a powder was attempted using the process of the invention and a hard grade (Shore D) of polyurethane resin (Pellethane® 75D, Dow Chemical Company). Over a measured temperature range of 160–200° C. in extruder zones 2, 3, and 4, only large particles of 1–5 mm diameter were formed, but no powder.

What is claimed is:

1. A process for making a polyurethaneurea powder comprising the steps of:

feeding a polyurethaneurea-based spandex to an extruder having at least one heating zone at a rate less than the maximum feed rate of the extruder; and extruding the spandex so that it is subjected to an average temperature range and a total residence time range such that the polyurethaneurea is not degraded and the powder is formed.

2. The process of claim 1 wherein the average temperature is in the range of about 170° to 220° C. and the total residence time is in the range of about 3.5 to 22 seconds, provided that when the total residence time is no longer than about 5 seconds, the spandex is subjected to a temperature higher than about 210° C. in at least one heating zone.

3. The process of claim 2 wherein an additional step of pre-heating the spandex to at least about 150° C. in a first heating zone is added between the feeding step and the extruding step, and the average temperature is measured in subsequent heating zones.

4. The process of claim 3 wherein the average temperature in the subsequent heating zones is in the range of about 180° to 200° C., and the total residence time is in the range of about 10 to 20 seconds.

5. The process of claim 3 wherein the extruder has a cooled throat, the spandex has a decitex in the range of about 11 to 2500, and the extrudate is cooled with air.

6. The process of claim 5 wherein the spandex has a decitex in the range of about 11 to 155.

7. A polyurethaneurea powder made by the process of claim 1.

8. The polyurethaneurea powder of claim 7 having a size distribution in which at least about 30 wt % of the powder has an average length of about 0.1 cm.

* * * * *